US008150940B2

(12) United States Patent
Smith et al.

(10) Patent No.: US 8,150,940 B2
(45) Date of Patent: *Apr. 3, 2012

(54) METHODS AND SYSTEMS FOR COMMUNICATING WITH SERVICE TECHNICIANS IN A TELECOMMUNICATIONS SYSTEM

(75) Inventors: Steven G. Smith, Roswell, GA (US); Jessie Bert Hunt, Jr., Rome, GA (US); Lawrence E. Ertley, Stone Mountain, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 913 days.

This patent is subject to a terminal disclaimer.

(21) Appl. No.: 11/943,206

(22) Filed: Nov. 20, 2007

(65) Prior Publication Data

US 2008/0120395 A1  May 22, 2008

Related U.S. Application Data

(63) Continuation of application No. 10/074,325, filed on Feb. 12, 2002, now Pat. No. 7,308,482.

(51) Int. Cl.
*G06F 15/16* (2006.01)
(52) U.S. Cl. .................... 709/217; 709/206; 709/219
(58) Field of Classification Search .................. 709/217, 709/219, 204–207, 246; 705/7; 726/4
See application file for complete search history.

(56) References Cited

U.S. PATENT DOCUMENTS

| | | |
|---|---|---|
| 4,841,560 A | 6/1989 | Chan et al. |
| 4,922,516 A | 5/1990 | Butler et al. |
| 4,977,399 A | 12/1990 | Price et al. |
| 5,528,660 A | 6/1996 | Heins et al. |
| 5,615,121 A | 3/1997 | Babayev et al. ................ 705/9 |
| 5,666,481 A | 9/1997 | Lewis |
| 5,687,212 A | 11/1997 | Kinser, Jr. et al. |
| 5,703,929 A | 12/1997 | Schillaci et al. |
| 5,798,733 A | 8/1998 | Ethridge |
| 5,880,958 A | 3/1999 | Helms et al. |

(Continued)

FOREIGN PATENT DOCUMENTS

EP  0 712 227 A2  5/1996

(Continued)

OTHER PUBLICATIONS

U.S. Appl. No. 10/032,530, filed Oct. 24, 2001.

(Continued)

*Primary Examiner* — Chirag Patel
(74) *Attorney, Agent, or Firm* — Parks IP Law LLC; Jennifer P. Medlin, Esq.

(57) ABSTRACT

Methods and systems are provided for communicating with a technician at a customer service location in a telecommunications system. One method embodiment includes generating an electronic message in an administration system; transmitting the generated electronic message from the administration system through a technician server operatively associated with the administration system; and, displaying the generated electronic message on a screen display adapted for viewing with an access device of the technician at the customer service location. One system embodiment includes an administration system configured for generating at least one electronic message; a technician server operatively associated with the administration system; and, a screen display adapted for receiving and displaying the generated electronic message for viewing on an access device of the technician at the customer service location. Computer-readable media embodiments of the present methods are also provided.

12 Claims, 3 Drawing Sheets

U.S. PATENT DOCUMENTS

| | | | |
|---|---|---|---|
| 5,881,131 A | 3/1999 | Farris et al. ............... 379/15.03 |
| 5,896,440 A | 4/1999 | Reed et al. |
| 5,897,640 A | 4/1999 | Veghte et al. |
| 5,901,284 A | 5/1999 | Hamdy-Swink |
| 5,920,846 A * | 7/1999 | Storch et al. ..................... 705/7 |
| 5,922,040 A | 7/1999 | Prabhakaran |
| 5,937,048 A | 8/1999 | Pelle |
| 5,956,024 A | 9/1999 | Strickland et al. |
| 5,987,381 A | 11/1999 | Oshizawa |
| 5,995,624 A | 11/1999 | Fielder et al. |
| 6,061,346 A | 5/2000 | Nordman |
| 6,094,688 A | 7/2000 | Mellen-Garnett et al. |
| 6,101,443 A | 8/2000 | Kato et al. |
| 6,141,609 A | 10/2000 | Herdeg et al. |
| 6,154,152 A | 11/2000 | Ito |
| 6,161,182 A | 12/2000 | Nadooshan |
| 6,167,255 A | 12/2000 | Kennedy, III et al. |
| 6,185,484 B1 | 2/2001 | Rhinehart |
| 6,192,314 B1 | 2/2001 | Khavakh et al. |
| 6,212,635 B1 | 4/2001 | Reardon |
| 6,215,855 B1 | 4/2001 | Schneider |
| 6,246,361 B1 | 6/2001 | Weill et al. |
| 6,285,931 B1 | 9/2001 | Hattori et al. |
| 6,332,163 B1 | 12/2001 | Bowman-Amuah |
| 6,343,290 B1 | 1/2002 | Cossins et al. |
| 6,389,426 B1 | 5/2002 | Turnbull et al. |
| 6,427,119 B1 | 7/2002 | Stefan et al. |
| 6,430,562 B1 | 8/2002 | Kardos et al. |
| 6,477,238 B1 | 11/2002 | Schneider et al. |
| 6,477,526 B2 | 11/2002 | Hayashi et al. |
| 6,484,092 B2 | 11/2002 | Seibel |
| 6,505,120 B2 | 1/2003 | Yamashita et al. |
| 6,516,055 B1 | 2/2003 | Bedeski et al. |
| 6,526,349 B2 | 2/2003 | Bullock et al. |
| 6,532,418 B2 | 3/2003 | Chun et al. |
| 6,678,826 B1 | 1/2004 | Kelly et al. |
| 6,715,082 B1 | 3/2004 | Chang et al. |
| 6,721,779 B1 | 4/2004 | Maffeis |
| 6,735,293 B2 | 5/2004 | Doherty et al. ............ 379/201.12 |
| 6,775,689 B1 * | 8/2004 | Raghunandan ............... 709/206 |
| 6,865,557 B1 | 3/2005 | Cordery et al. |
| 6,891,937 B1 | 5/2005 | Kuhn et al. |
| 6,993,658 B1 | 1/2006 | Engberg et al. |
| 7,035,854 B2 | 4/2006 | Hsiao et al. |
| 7,039,714 B1 | 5/2006 | Blakley, III et al. |
| 7,206,936 B2 | 4/2007 | Aull et al. |
| 7,308,482 B2 | 12/2007 | Smith et al. ................... 709/217 |
| 7,945,776 B1 | 5/2011 | Atzmony et al. |
| 2001/0005890 A1 * | 6/2001 | Nitaki ............................ 713/202 |
| 2002/0010679 A1 | 1/2002 | Felsher |
| 2002/0046342 A1 | 4/2002 | Eltelo et al. |
| 2002/0091933 A1 | 7/2002 | Quick et al. |
| 2002/0120713 A1 | 8/2002 | Gupta et al. |
| 2002/0194341 A1 * | 12/2002 | Gupta ........................... 709/227 |
| 2003/0200202 A1 | 10/2003 | Hsiao et al. |
| 2004/0098595 A1 | 5/2004 | Aupperle et al. |
| 2005/0125677 A1 | 6/2005 | Michaelides |
| 2007/0043954 A1 | 2/2007 | Fox |
| 2007/0050635 A1 | 3/2007 | Popp |
| 2007/0094387 A1 * | 4/2007 | Hahn et al. .................... 709/224 |
| 2007/0136603 A1 | 6/2007 | Kuecuekyan |

FOREIGN PATENT DOCUMENTS

| | | |
|---|---|---|
| EP | 0 712 227 A3 | 11/1999 |
| WO | WO 00/02365 | 1/2000 |

OTHER PUBLICATIONS

International Application No. PCT/US02/33667 filed Oct. 25, 2001.
U.S. Appl. No. 10/103,045, filed Mar. 21, 2002.
U.S. Appl. No. 10/060,562, filed Jan. 30, 2002.
International Application No. PCT/US03/02742 filed Jan. 30, 2003.
U.S. Appl. No. 10/175,699, filed Jun. 20, 2002.
U.S. Appl. No. 10/246,188, filed Sep. 18, 2002.
U.S. Appl. No. 10/032,853, filed Oct. 25, 2001.
U.S. Appl. No. 10/445,861, filed May 27, 2003.
International Application No. PCT/US02/33755 filed Oct. 22, 2002.
Borcherding, Malte "Mobile Security—An Overview of GSM, SAT and WAP", CQRE'99, LNCS 1740, pp. 133-141 (1999).
Foreman, John et al. "Software Technology Review", Canegie Melton Univ., Software Engineering Institute, pp. 1-22, 42-46, 239-246, 321-324 (1997).
Serial Number—The American Heritage College Dictionary, 4th ed., Houghton Mifflin Company (2002).
Parasuraman, Raja et al. "A Model for Types and Levels of Human Interaction with Automation", IEEE Transactions on Systems, Man, and Cybernetics, 30(3):286-297 (2000).

* cited by examiner

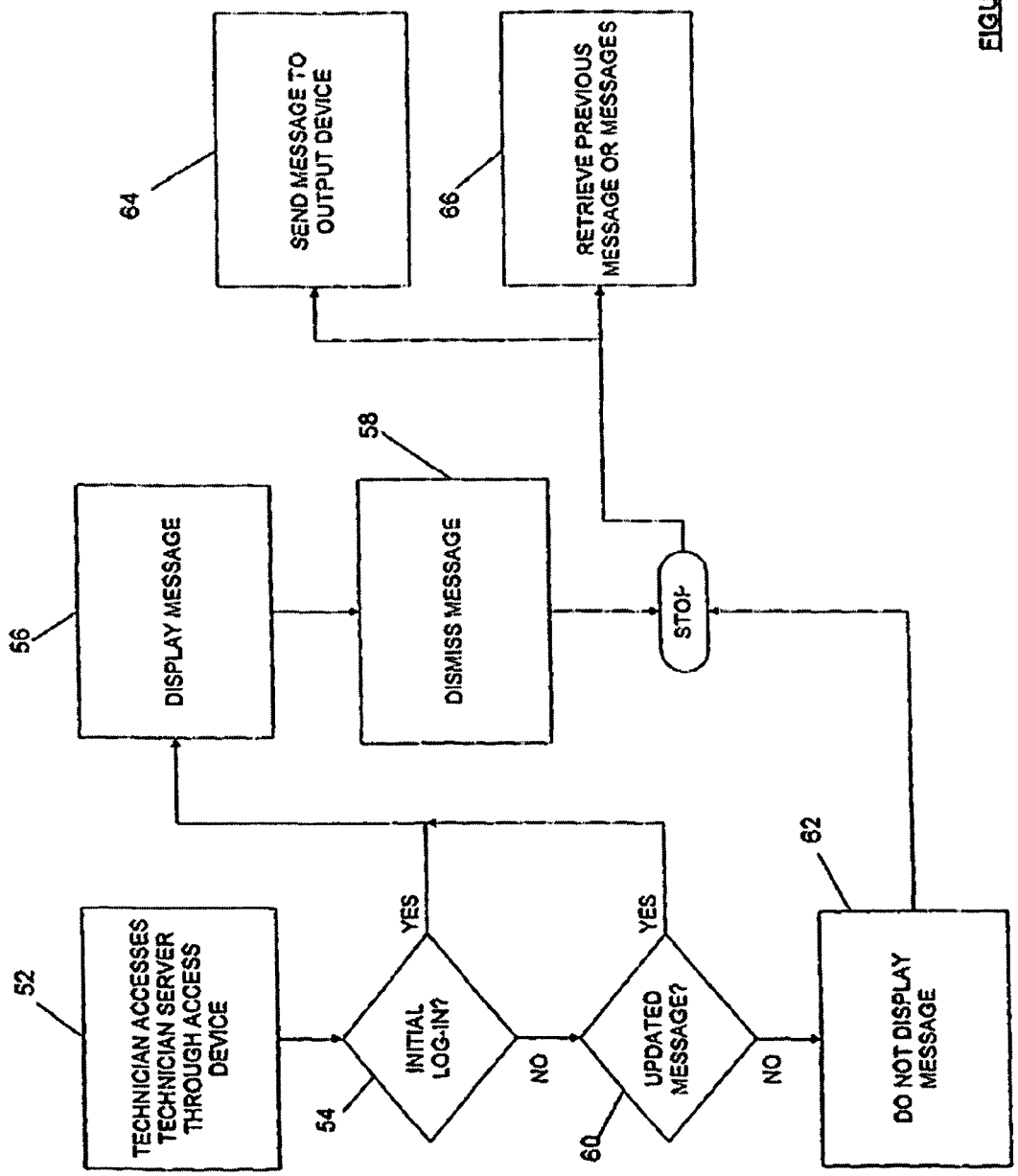

METHODS AND SYSTEMS FOR COMMUNICATING WITH SERVICE TECHNICIANS IN A TELECOMMUNICATIONS SYSTEM

RELATED APPLICATIONS

This application is a continuation of U.S. application Ser. No. 10/074,325 entitled "Methods and Systems for Communicating with Service Technicians in a Telecommunications System" filed Feb. 12, 2002 now U.S. Pat. No. 7,308,482, which is incorporated herein by reference.

BACKGROUND OF THE INVENTION

Efficient and effective customer service is an essential requirement for commercial enterprises to compete successfully in today's business world. In the telecommunications industry, for example, providing customer service is an important part of sustaining market share in view of the many competitors in the industry. Customers whose telephone service, for example, is interrupted or disconnected for even a relatively short period of time may desire to seek an alternative source for service, especially if the interruption or disconnection is not addressed by a quick and effective customer service response. Communicating with one or more technicians providing service in a telecommunications network is an important component of ensuring the proper function of the network and promoting a high level of customer service.

Service technicians in a telecommunications system typically perform field service operations at a variety of remote locations. These technicians often need to receive instructions and other advisory information at these remote locations from one or more sources supervising the work of the technicians. When accessing functionality such as an access device, for example, to service telecommunications equipment at a customer location, a technician may not be provided with information that would be beneficial for providing service at that location. Since technicians perform service at remote locations, the technicians usually do not have a common method or system for receiving instructions or other advisory information from a supervisory source.

What are needed, therefore, are more effective methods and systems for communicating instructions and/or advisory information to technicians at remote customer service locations. More efficient methods and systems of common communication are also needed to provide information to technicians based on the type and location of the technicians and/or the service performed by the technicians.

SUMMARY

In one embodiment of the present methods and systems, a method is provided for communicating with a technician at a customer service location in a telecommunications system. The method includes generating an electronic message in an administration system, transmitting the generated electronic message from the administration system through a technician server operatively associated with the administration system; and, displaying the generated electronic message on a screen display adapted for viewing with an access device of the technician at the customer service location. Computer-readable media embodiments of the present methods are also provided.

In another embodiment of the present methods and systems, a system is provided for communicating with a technician at a customer service location in a telecommunications system. The system includes an administration system configured for generating at least one electronic message; a technician server operatively associated with the administration system; and, a screen display adapted for receiving and displaying the generated electronic message for viewing on an access device of the technician at the customer service location.

DETAILED DESCRIPTION

Figure 1:
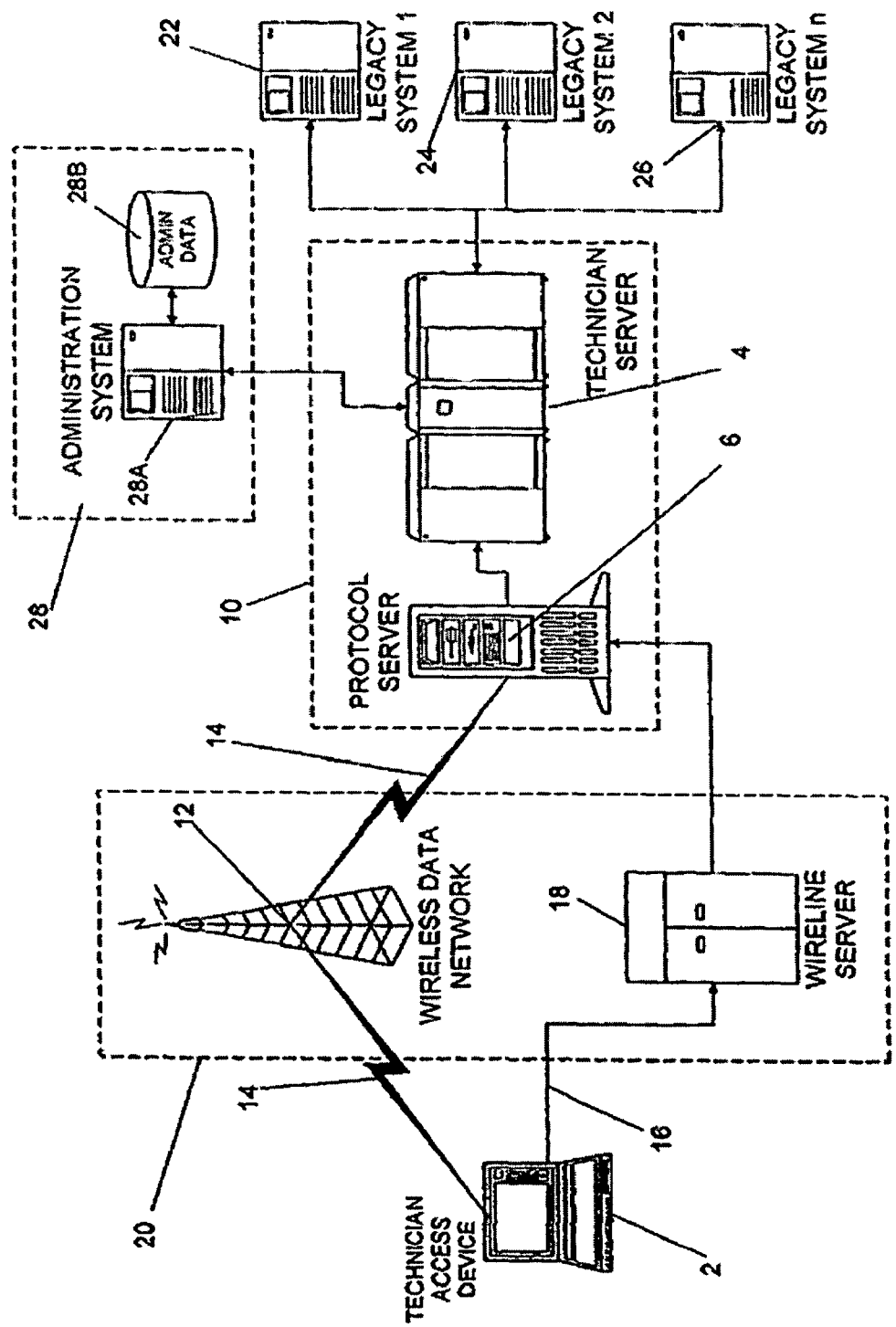
FIG. 1 is a schematic diagram depicting one embodiment of a system for obtaining, transmitting, and processing information related to a telecommunications network.
Figure 2:
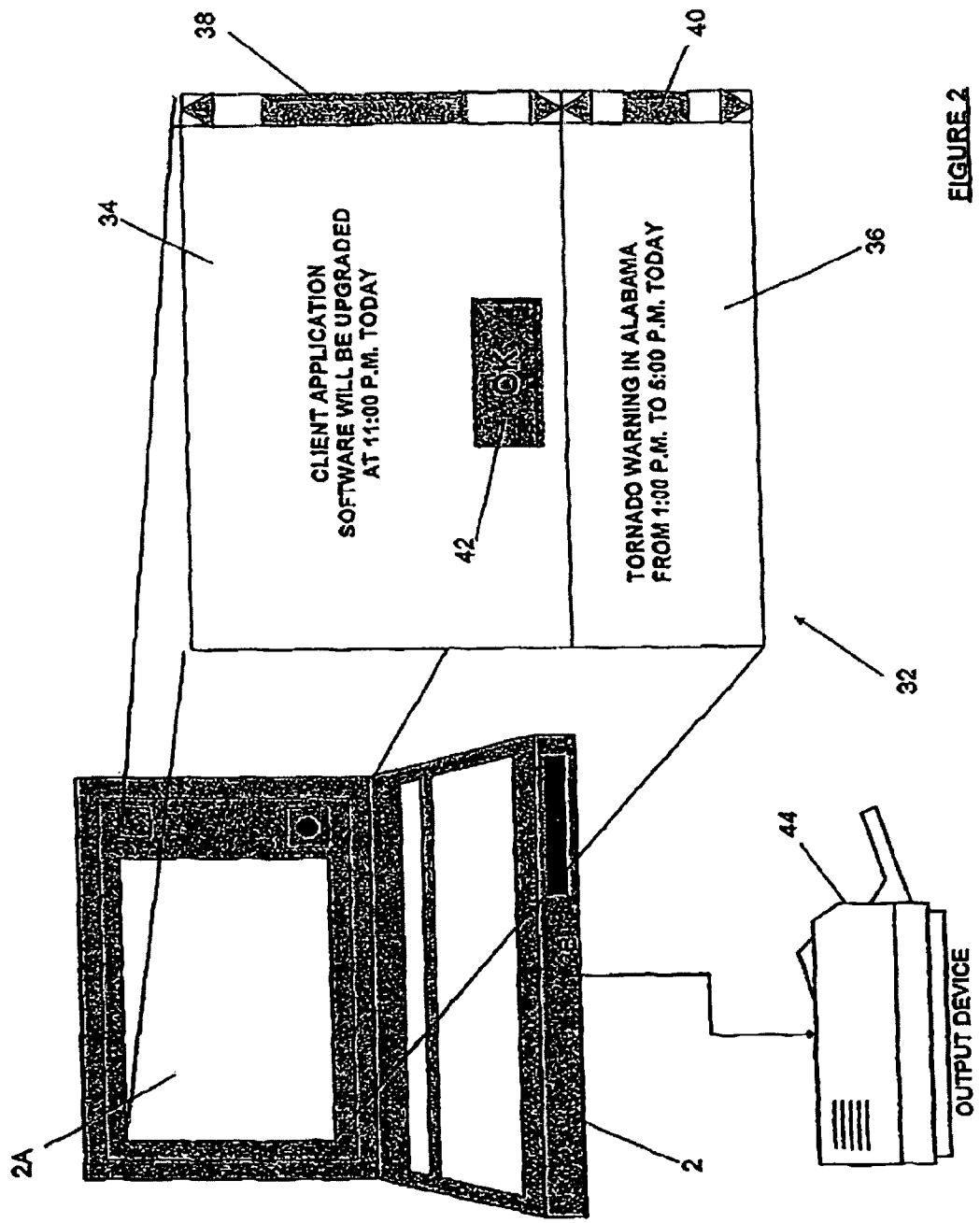
FIG. 2 is a schematic diagram depicting a portion of the system of FIG. 1 in more detail; and, FIG. 3 is a process flow diagram showing one embodiment of a method for obtaining, transmitting and processing information related to a telecommunications network.

Referring now to FIGS. 1 and 2, a service technician working at a customer service location in a telecommunications network is provided with a technician access device 2. The access device 2 assists the technician in gathering, receiving and transmitting information related to service performed on telecommunications equipment.

The access device 2 can be, for example, a wireless personal computer, a laptop, a personal digital assistant (PDA), a wireless pager or any other device suitable for receiving and transmitting data associated with providing service at the customer service location. As used herein, a "computer" may be a microcomputer, minicomputer, laptop, personal data assistant, cellular phone, two-way pager, processor, or any computerized device capable of transmitting and receiving data over a shared network. The access device 2 can also be "ruggedized" as that term is understood in the art to resist physical damage during field service operations, for example.

In addition, the access device 2 can be a remote and portable computer used by the technician. The access device 2 can include memory for storing certain software applications used in obtaining and communicating data. The memory can be internal or external. The memory can also include any means for storing software, including a hard disk, an optical disk, floppy disk, ROM (read only memory), RAM (random access memory), PROM (programmable ROM), EEPROM (extended erasable PROM), and other like computer-readable media.

The access device 2 is also configured and programmed to permit the service technician to access a technician server 4. The technician server 4 functions as a transaction request broker between a protocol server 6 and one or more other systems operatively connected to the technician server 4. Collectively, the technician server 4 and the protocol server 6 can be considered a systems interface 10 for the system embodiment shown in FIG. 1. Access to the technician server 4 can be enabled through a wireless data network 12 through a radio frequency connection 14. Access to the technician server 4 can also be enabled by a modem connection 16 to a wireline server 18. The wireless data network 12 and the wireline server 18 can collectively be considered a communications network 20 for purposes of illustration and convenience of disclosure of the present methods and systems.

The communications network 20 may be any communications network that permits a computer to access a remote server. The communications network 20 can be a wireline network, wireless or cellular network, satellite network, and so forth. In one aspect of the present methods and systems, the communications network 20 is a Public Switched Telephone Network (PSTN) such as, for example, the BellSouth Communications Network (BSCN). The communications network 20 can also be a wireless communications network such as, for example, the Cingular Wireless Network.

As shown in FIG. 1, the protocol server 6 receives and processes communications from the communications network 20. During operation of the access device 2 by a technician or other user, the protocol server 6 processes information transmitted from the access device 2 including, for example, a user ID, a password, a radio serial number, an access device serial number, and other similar data associated with the service technician performing service on telecommunications equipment at a customer location. These and other types of data can be processed by the communications network 20 and the systems interface 10 through a number of legacy systems 22, 24, 26. These other data can include, for example, customer account number, signal decibel level, circuit number, signal response time, as well as many other types of data acquired from the service location.

In general, the protocol server 6 provides a protocol and middleware interface between the access device 2 and the technician server 4. The protocol server 6 may receive user requests or other messages from the access device 2, route requests or messages to the technician server 4; receive responsive information from the technician server 4; and route responsive information back to the access device 2. In one embodiment of the present methods and systems, the protocol server 6 can include one or more NT servers running "NetTech" software from Broadbeam Corporation (Princeton, N.J.). In another embodiment, the technician server 4 can utilize UNIX operating system software executed on an Informix database management system. In another aspect, the protocol server 6 can include one or more WINDOWS NT servers (Microsoft Corporation) configured to assign one or more logical ports to transmissions received from the access device 2.

In one or more embodiments of the present methods and systems. the communications network 20, the systems interface 10, the access device 2. the software and hardware contained on the access device 2 and other aspects of the present disclosure are provided in accordance with the disclosure of the commonly owned, U.S. patent application Ser. No. 09/343,815, entitled "Systems and Methods for Utilizing a Communications Network for Providing Mobile Users Access to Legacy Systems" ("the '815 application"), the entirety of which is hereby incorporated by reference. In one embodiment in accordance with the '815 application, the technician server 4 is provided in connection with the trade-designated "TECHNET" system. In another aspect of the present methods and systems, the technician server 4 can be a server having a "TECHACCESS" trade designation (Telcordia Technologies). In general, the technician server 4 can be a conventional server configured and programmed to verify and/or process information, including test data, received from the access device 2.

In general, the technician server 4 provides an interface to the legacy systems 22, 24, 26 from which responsive information can be retrieved. The technician server 4 may service requests, generate legacy transactions in connection with one or more of the legacy systems 22, 24, 26 in response to those requests, and receive responsive information to be forwarded back to the protocol server 6. The legacy systems 22, 24, 26 are generally mainframe-type computer systems that maintain data for a company. According to one or more embodiments of the present methods and systems, the legacy systems 22, 24, 26 can include one or more of the following systems: a loop facility assignment control system; a loop maintenance operations system; a computer system for mainframe operations; a mechanized loop testing system; a secure network element contract server; a mechanized time reporting system; a work activity statistical sampling plan system; and other similar systems.

In addition, an administration system 28 can be operatively associated with the technician server 4. The administration system 28 can include a server 28A and one or more databases 28B that contain information related to performing service at a customer location. The database 288 contains a variety of information related to the technician, the equipment employed by the technician such as the access device 2, for example, and data related to numerous customer service locations. Examples of data maintained in the administration system 28 can include, without limitation, serial numbers of technician access devices; technician names; names of technician supervisors; maintenance center indicia; indicia associated with the version of software employed by access devices; user name and password information; log-in data associated with a particular technician; and, geographical locations of technicians including, for example, the state in which a particular technician is located. In general, the administration system 28 includes hardware and software that interact with the technician server 4 to provide information to the access device 2 of a technician at a customer service location.

Referring now to FIG. 1, a user of the access device 2, such as a technician, accesses the systems interface 10 through the communications network 20. The technician may login through the protocol server 6 to technician server 4 using a user name and other data, such as a password and/or primary host group address. Once the technician has been authenticated as a legitimate user of the access device 2, a "TECHNET" session can be established and the access device 2 can be connected through the communications network 20 to the systems interface 10. After the log-in, the systems interface 10 permits the access device 2 to make requests for information from the legacy systems 22, 24, 26. The user can make the requests by entering commands into the access device 2 that are input to the systems interface 10. After receiving input commands, the systems interface 10 processes the inputs to generate user requests and generate legacy transactions based on the user requests, receive information from the legacy systems 22, 24, 26, and transmit the information back to the access device 2. In addition, the administration system 28 can interact with the access device 2 during login such as, for example, to verify user name and password information or to transmit information to the access device 2.

The access device 2 can include software that executes a client application for accessing the systems interface 10. In one aspect, the access device 2 executes the client application disclosed as the "TECHNET" client application in the '815 application. The "TECHNET" client application includes a graphical user interface (GUI) layer that provides a user interface for receiving requests for information from the user, displaying information retrieved from the legacy systems 22, 24, 26, displaying information transmitted by the administration system 28, and other user interface tasks. A technician can make the requests by keyboard entry of inputs, for example, to the client GUI included with the access device 2. The technician can select a particular operation such as, for example, "Retrieve Customer Information" by using the client application on the access device 2. In operation, the access device 2 can also interact with the administration system 28 to obtain data related to service performed at a customer location.

Referring now to FIGS. 1 through 3, in one embodiment of the present methods and systems, a technician accesses the technician server 4 in step 52 using the access device 2. Once the technician is permitted access to the technician server 4, the technician server 4 verifies in step 54 whether or not this is the first time that the user has accessed the technician server 4 within a given time period. In one aspect, this time period is based on daily procedures performed by the technician in connection with the technician server 4. In step 56, if it is determined that this is the first time in a given time period that the user has accessed the technician server 4, the technician server 4 retrieves an electronic message 32 from the administration system 28. The technician server 4 forwards the electronic message 32 in step 56 through the systems interface 10 and the communications network 20 to a display screen 2A of the access device 2 wherein the electronic message 32 can be displayed. In step 58, the technician can dismiss the electronic message 32 such as, for example, by clicking an "OK" button 42 that accompanies the electronic message 32. It can be appreciated that the "OK" button 42 can be provided with or without dialogue and that other conventional means of dismissing the message 32 can also be provided.

In step 60, if it is determined that the electronic message 32 has been modified in the administration system 28 since the last time the technician accessed the technician server 4, the electronic message 32 can be displayed in step 56 as discussed above. Otherwise, in step 62, if it is determined that this is not the first time that the user has accessed the system within a given time period, and the electronic message has not been modified since the technician accessed the technician server 4, the electronic message 32 is not sent to the access device 2 for display.

In one aspect of the present methods and systems, in step 64 the technician can choose to send a message to an output device 44 such as a printer, for example, or another output device 42 such as a fax machine, a pager, a memory storage, or another suitable output device 42. In another aspect, in step 66 the technician can retrieve one or more previously transmitted electronic messages. In another aspect, the technician server 4 permits the technician to select and retrieve multiple archived electronic messages and read the retrieved messages in a scrollable list box. For example, archived messages can be stored by chronological order, by date first displayed, in a file that is accessible by the technician or another user from a drop down list or another conventional functionality.

As shown in FIG. 2, the electronic message 32 can include a first portion 34 and a second portion 36. Each of these portions 34, 36 can further include a scroll bar 38, 40 (respectively) functionality that permits an electronic message 32 to be transmitted that is larger in size than the available size of the screen display 2A. It can be seen that these scroll bars 38, 40 can be employed by the technician to scroll through one or both portions 34, 36 of the electronic message 32 that may not be presently viewable on the screen display 2A.

In one aspect of the present methods and systems, the electronic message 32 is submitted in a format that substantially fills the available space on the screen display 2A. The electronic message 32, as discussed above, can be separated into two or more portions (such as portions 34, 36 as shown in FIG. 2) to allow different messages to be displayed from different sources. In one aspect, the first portion can fill a majority of the space available on the screen display 2A, and the second portion can fill the balance of the space available on the screen display 2A. The text of the electronic message 32 can include any combination of text, title, and header information and can be submitted to the access device 2 as a text file, a word processing file or in another conventional format suitable for text presentation. In one aspect, the electronic message 32 can include, for example, text that is formatted for display with multiple fonts, multiple font sizes, bold characters, italicized characters, and underlined characters, among other types of commonly available text formatting.

As discussed above, the electronic message 32 can be displayed to the technician on the initial login by the technician in a given time period, such as each day, for example. In the event that the technician logs out and logs in again in that same time period, the electronic message 32 can be displayed if a new or modified electronic message 32 is available for display. In one embodiment of the present methods and systems, the electronic message 32 is maintained and stored in the administration system 28. The text of the electronic message 32 can be created, read, updated, deleted or otherwise modified by an administrator or other supervisory user of the administration system 28.

In another aspect of the present methods and systems, the portions 34, 36 of the electronic message can be customized for transmission to different groups of technicians. This customization of the portions 34, 36 can be dependent on a number of profile characteristics stored in the administration system 28 for the various technicians that access the technician server 4. For example, one such characteristic can be that a technician works for a company that provides telecommunications service and another such characteristic can be a current geographic location of a technician. In operation of this example, the administration system 28 can be configured to send an electronic message 32 with the first portion 34 associated with the company characteristic and the second portion 36 associated with the geographic location characteristic. Therefore, an electronic message 32 could be generated in the administration system 28 and displayed on the screen display 2A of the access device 2 that includes company-specific information in the first portion 34 of the message 32 and geographic-specific information in the second portion 36 of the message 32. In one example, it can be seen that an electronic message 32 can be broadcast with information in the first portion 34 that is displayed for all technicians in the same company and with information in the second portion 36 that is displayed only to technicians in a particular geographic location (e.g., the state of Louisiana).

Examples of electronic messages can include, without limitation, instructions on how to manage software and hardware components (e.g., "Follow these instructions when logging off today, due to installation of a new software version."), safety messages alerting technicians of hazards in their environment (e.g., "Work safe today, your life depends on it."), company announcements, directives, and job aids. In addition, based on the location of the technician, the message can convey geographic-specific information (e.g., "Tornado warning in lower Alabama today between 8:00 a.m. and 11:00 a.m."). It can be appreciated that a wide variety of electronic messages of different type and content can be transmitted to the technician.

The term "computer-readable medium" is defined herein as understood by those skilled in the art. A computer-readable medium can include, for example, memory devices such as diskettes, compact disc of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Examples presented herein are intended to illustrate potential implementations of the present communication method and system embodiments. It can be appreciated that such examples are intended primarily for purposes of illustration. No particular aspect or aspects of the example method and system embodiments described herein are intended to limit the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A method for communicating with a particular technician, the method comprising:
   receiving from a technician access device, a request, initiated by the particular technician, for access to an electronic message;
   determining whether to satisfy the request for access based at least partially on whether the request for access is a first request for access from the particular technician within a predetermined time period; and
   only if it is determined that the request for access is a first request for access from the particular technician within the predetermined time period, transmitting the electronic message to the technician access device
   wherein the electronic message is separated into at least two portions customized for respective groups of technicians including the particular technician; and
   transmitting the electronic message to the technician access device includes a technician server transmitting an applicable portion of the electronic message of the at least two portions of the electronic message to the technician access device
   wherein the portions of the electronic message are customized based on profile characteristics stored in an administration system in communication with the technician server.

2. The method of claim 1 further comprising:
   determining whether the electronic message has been modified since a past request for access from the particular technician;
   wherein transmitting the electronic message to the technician access device is performed only if:
      it is determined that the request for access is a first request for access from the particular technician within the predetermined time period; and
      it is determined that the message has net been modified since the past request for access from the particular technician.

3. The method of claim 1, wherein:
   the request received from the technician access device is an access request; and
   the method further comprises:
      receiving an output request from the technician access device to send the message to an output device; and
      initiating delivery of the electronic message to the output device in response to the output request.

4. The method of claim 1, wherein the time period, considered in determining whether to satisfy the request for access based on whether the request for access is a first request for access for the particular technician, is based on a daily procedure performed by the particular technician.

5. A non-transitory tangible computer-readable medium storing instructions that, when executed by a processor, cause the processor to at least:
   receive from a technician access device, a request, initiated by a particular technician, for access to an electronic message:
   determine whether to satisfy the request for access based at least partially on whether the request for access is a first request for access from the particular technician within a predetermined time period; and
   only if it is determined that the request for access is a first request for access from the particular technician within the predetermined time period, initiate transmission of the electronic message to the technician access device
   wherein the electronic message is separated into at least two portions customized for respective groups of technicians including the particular technician; and
   the instructions are configured to cause the processor to, in initiating transmission of the electronic message to the technician access device, initiate transmission of an applicable portion of the electronic message of the at least two portions of the electronic message
   wherein the portions of the electronic message are customized by the processor, executing the instructions, based on profile characteristics stored in an administration system in communication with the computer-readable medium.

6. The non-transitory tangible computer-readable medium of claim 5, wherein the instructions, when executed by the processor, cause the processor to:
   determine whether the electronic message has been modified since a past request for access from the particular technician;
   wherein transmission of the electronic message to the technician access device is initiated only if:
      it is determined that the request for access is a first request for access from the particular technician within the predetermined time period; and
      it is determined that the message has net been modified since the past request for access from the particular technician.

7. The non-transitory tangible computer-readable medium of claim 5, wherein:
   the request received from the technician access device is an access request; and
   the instructions further cause the processor to:
      receive an output request from the technician access device to send the message to an output device; and
      initiate delivery of the electronic message to the output device in response to the output request.

8. The non-transitory tangible computer-readable medium of claim 5, wherein the time period, considered in determining whether to satisfy the request for access based on whether the request for access is a first request for access for the particular technician, is based on a daily procedure performed by the particular technician.

9. A system for communicating with a particular technician, the system comprising:
   a memory storing computer-readable instructions; and a processing unit;

wherein the computer-readable instructions, when executed by the processing unit, cause the processing unit to at least:
receive from a technician access device, a request, initiated by the particular technician, for access to an electronic message;
determine whether to satisfy the request for access based at least partially on whether the request for access if a first request for access from the particular technician within a predetermined time period; and
only if it is determined that the request for access is a first request for access from the particular technician within the predetermined time period, initiate transmission of the electronic message to the technician access device
wherein the electronic message is separated into at least two portions customized for respective groups of technicians including the particular technician; and
the instructions are configured to cause the processing unit to, in initiating transmission of the electronic message to the technician access device, initiate transmission of an applicable portion of the electronic message of the at least two portions of the electronic message
wherein the portions of the electronic message are customized by the processing unit, executing the instructions based on profile characteristics stored in an administration system in communication with the processing unit.

10. The system of claim 9, wherein the instructions, when executed by the processing unit, cause the processing unit to:
determine whether the electronic message has been modified since a past request for access from the particular technician;
wherein transmission of the electronic message to the technician access device is initiated only if:
it is determined that the request for access is a first request for access from the particular technician within the predetermined time period; and
it is determined that the message has been modified since the past request for access from the particular technician.

11. The system of claim 9, wherein:
the request received from the technician access device is an access request; and
the instructions further cause the processing unit to:
receive an output request from the technician access device to send the message to an output device; and
initiate delivery of the electronic message to the output device in response to the output request.

12. The system of claim 9, wherein the time period, considered in determining whether to satisfy the request for access based on whether the request for access is a first request for access for the particular technician, is based on a daily procedure performed by the particular technician.

* * * * *